United States Patent

Kato et al.

[11] Patent Number: 5,477,294
[45] Date of Patent: Dec. 19, 1995

[54] CAMERA OF WHICH THE PHOTOGRAPHING IMAGE FIELD IS CHANGEABLE

[75] Inventors: Minoru Kato, Kawasaki; Kiyosada Machida, Urawa; Hidenori Miyamoto, Urayasu, all of Japan

[73] Assignee: Nikon Corporation, Tokyo, Japan

[21] Appl. No.: 417,469

[22] Filed: Apr. 5, 1995

Related U.S. Application Data

[63] Continuation of Ser. No. 236,253, May 2, 1994, abandoned, which is a continuation of Ser. No. 115,028, Sep. 2, 1993, abandoned.

Foreign Application Priority Data

Sep. 8, 1992 [JP] Japan ................................ 4-265497

[51] Int. Cl.$^6$ ........................... G03B 17/02; G03B 37/00
[52] U.S. Cl. ................................................ 354/159; 354/94
[58] Field of Search ........................... 354/94, 159, 288, 354/187, 195.1

[56] References Cited

U.S. PATENT DOCUMENTS

| 4,728,977 | 3/1988 | Yomogizawa et al. | 354/187 |
|---|---|---|---|
| 5,010,357 | 4/1991 | Misawa | 354/159 |
| 5,066,971 | 11/1991 | Kodaira | 354/465 |
| 5,086,311 | 2/1992 | Nara et al. | 354/195.1 |
| 5,325,140 | 6/1994 | Torikoshi et al. | 354/159 |
| 5,335,031 | 8/1994 | Ogawa | 354/159 |
| 5,398,088 | 3/1995 | Tamazaki | 354/106 |

FOREIGN PATENT DOCUMENTS

| 3-122435 | 12/1991 | Japan . |
|---|---|---|
| 4158345 | 6/1992 | Japan . |

*Primary Examiner*—Michael L. Gellner
*Assistant Examiner*—Nicholas J. Tuccillo
*Attorney, Agent, or Firm*—Shapiro and Shapiro

[57] ABSTRACT

A camera of which the photographing image field is changeable comprises an aperture member for prescribing a first photographing image field, first and second mask members movable in directions substantially perpendicular to an optical axis to thereby shield a portion of an opening in the aperture member from the opposite sides of the opening and define a second photographing image field, an operating member for moving the first mask member, and an interlocking member for moving the second mask member in the direction opposite to the direction of movement of the first mask member in operative association with the movement of the first mask member.

14 Claims, 5 Drawing Sheets

CAMERA OF WHICH THE PHOTOGRAPHING IMAGE FIELD IS CHANGEABLE

This is a continuation of application Ser. No. 08/236,253 filed May 2, 1994, which is a continuation of application Ser. No. 08/115,028 filed Sep. 2, 1993, both now abandoned.

BACKGROUND OF THE INVENTION

1. Field of the Invention

This invention relates to a camera of which the photographing image field is changeable to the standard size and the panorama size.

2. Related Background Art

As cameras of this kind, there are known, for example, ① a camera having a light intercepting plate rotatable about a shaft along a side of an aperture and covering a part of the aperture, and having operating means for effecting the rotation of the light intercepting plate by extraneous operation (Japanese Laid-Open Utility Model Application No. 3-84821), and ② a camera in which the opposed two sides of an aperture are always constituted by two image field regulating members irrespective of the size of the image field, and the image field regulating members are moved by moving means so as to be of two sizes of the image field and are biased to the positions of the sizes of the image field by toggle means (Japanese Laid-Open Utility Model Application No. 3-122435).

However, both of these prior-art cameras are complicated in mechanism and therefore have become bulky and have required increased costs.

Also, in a camera of great zoom ratio, the diameter of a lens unit facing the aperture becomes large and therefore, interference has taken place on the prior-art light intercepting plate and the camera could not be constructed as previously described.

Further, the lens barrel of a zoom camera is usually constructed of a combination of cylindrical members and therefore, it is difficult to construct the prior-art light intercepting plate within the lens barrel. In this case, it is necessary to provide a space between the lens barrel and the aperture and this has led to the problem of bulkiness.

SUMMARY OF THE INVENTION

So, it is an object of the present invention to provide a camera of which the image field is changeable and which can be manufactured at low costs because of its simple construction without being made bulky.

To solve the above-noted problems, the camera of the present invention of which the image field is changeable is characterized by an aperture member 3 having an opening in a plane substantially perpendicular to an optical axis for prescribing a first photographing image field, first and second mask members 5 and 4 for shielding a portion of the opening in said aperture member from opposite sides and defining a second photographing image field, an operating member 5c for moving said first mask member, and an interlocking member 8 for moving said second mask member in the opposite direction in operative association with the movement of said first mask member.

In this case, the interlocking member can be characterized in that it is a rotatable lever having one end thereof engaged with said first mask member and the other end thereof engaged with said second mask member, and having the center of rotation between the ends thereof. The lever extends in and rotates in a plane substantially perpendicular to the optical axis.

Also, the operating member can be characterized in that it is interlocked with a second operating member having a direction of operation differing from the direction of operation of the operating member itself.

Further, the first and second mask members can be characterized in that they fully shield the opening in said aperture member.

In the present invention, the design is such that the first and second mask members are moved in directions substantially perpendicular to the optical axis and the respective mask members are interlocked with each other by the interlocking member and therefore, the camera becomes simple in mechanism and the downsizing and low costs of the camera can be realized.

DETAILED DESCRIPTION OF THE PREFERRED EMBODIMENTS

Figure 1:
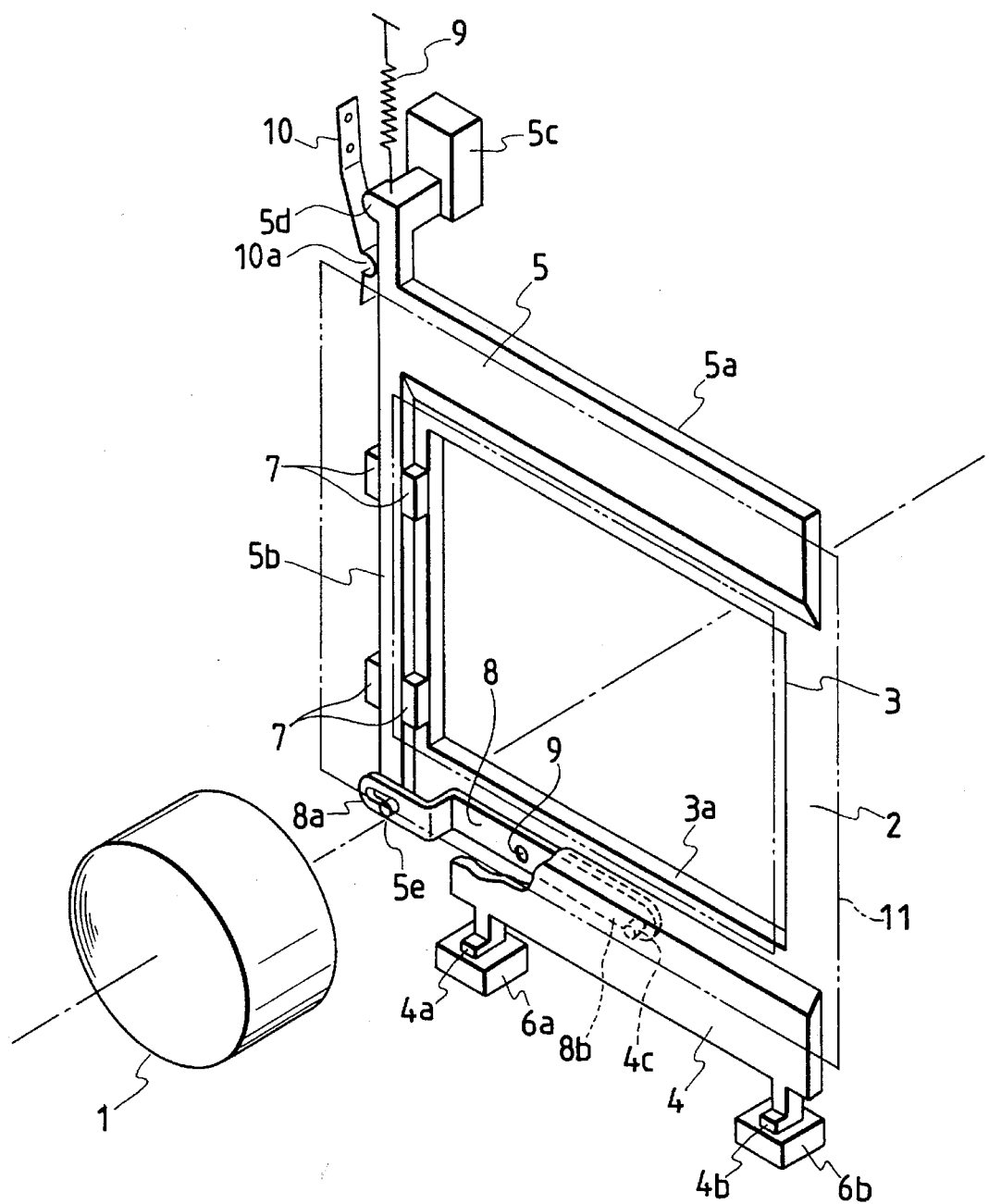
FIG. 1 is a perspective view showing a first embodiment of the camera of the present invention of which the photographing image field is changeable.

The present invention will hereinafter be described in detail with respect to some embodiments thereof shown in the drawings.

FIG. 1 is a perspective view showing a first embodiment of the camera of the present invention of which the photographing image field is changeable.

In FIG. 1, the reference numeral 1 designates a phototaking lens, the reference numeral 2 denotes a main body, the reference numeral 3 designates an aperture member formed with an opening in a portion of the main body 2, in a plane substantially perpendicular to an optical axis the reference numeral 4 denotes a second mask member, and the reference numeral 5 designates a first mask member.

The first mask member 5 has a vane portion 5a which extends substantially parallel to the plane of the opening and which provides the upper side of a photographing image field when the photographing image field is changed over to the panorama size, a support portion 5b supporting the vane portion 5a and movable in the vertical direction, an operating portion 5c provided on the upper end of the support portion 5b and operable to change the size of the photographing image field, a pin 5e engaged with a slot 8a in a rotatable lever 8, and a protruding portion 5d engaged with a leaf spring 10.

The first mask member 5 has its support portion 5b supported so as to be guided by guide portions 7 projected from the main body 2 and be movable only in the vertical direction, and is upwardly biased by a spring 9.

The operating portion 5c is protruded from a camera body, not shown, and is operable from the outside of the camera to change over the photographing image field to the standard size and the panorama size. The protruding portion 5d rides across the restraining portion 10a of the leaf spring 10 when the operating portion 5c is downwardly moved by extraneous operation, and the first mask member 5 is held in that position.

The rotatable lever 8 extends longitudinally in a plane substantially parallel to and adjacent to the plane of the opening in the aperture member and is supported for rotation in that plane about a shaft 9 protruded from the main body 2. This rotatable lever 8 has a slot 8a and a pin 8b, on which a slot 4c in the second mask member 4 is fitted to thereby rotatably support the second mask member 4.

The second mask member 4 is a member which extends substantially parallel to the plane of the opening in the aperture member and which provides the lower side of the photographing image field when the photographing image field is changed over to the panorama size, and has restraining portions 4a and 4b protrudedly provided on the lower side thereof. These restraining portions 4a and 4b are provided at locations substantially corresponding to bases 6a and 6b which are portions of the main body 2. Thereby, the second mask member 4 is held with an inclination substantially parallel to the underside 3a of the opening in the aperture member 3.

The first mask member 5, the second mask member 4 and the rotatable lever 8 are kept against movement in the direction of the optical axis by a keeper plate 11.

Figure 2:
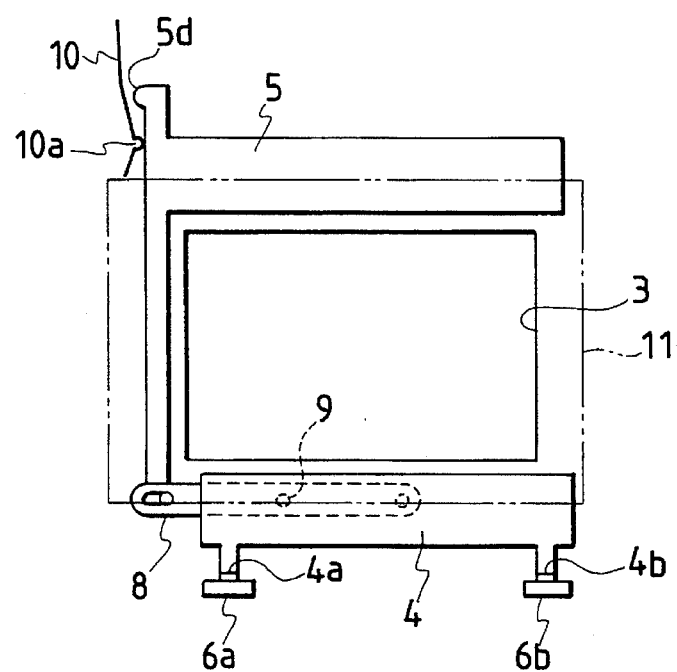
FIG. 2 is a plan view showing the camera of FIG. 1 during the photographing of the standard size.
Figure 3:
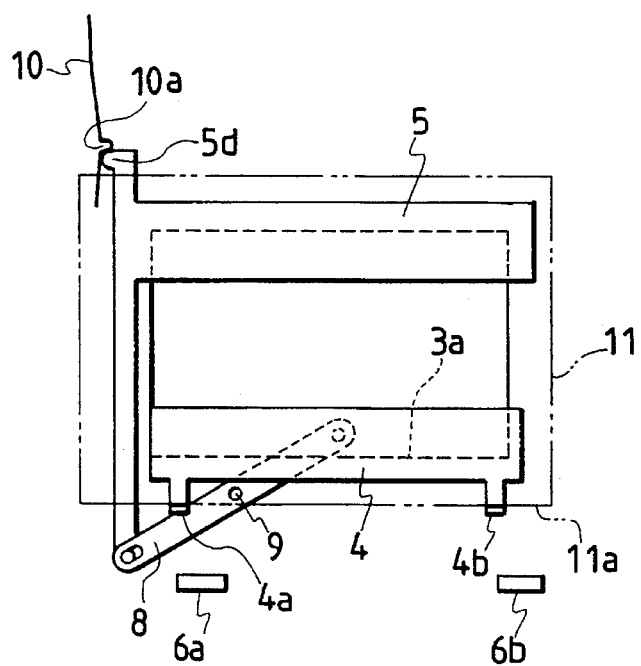
FIG. 3 is a plan view showing the camera of FIG. 1 during the photographing of the panorama size.

The operation of the first embodiment will now be described. FIG. 2 is a plan view showing the camera according to the first embodiment during the photographing of the standard size (the same state as FIG. 1), and FIG. 3 is a plan view showing the same camera during the photographing of the panorama size.

In the state of FIGS. 1 and 2, the opening in the aperture member 3 is fully open and the photographing of the standard opening size is possible.

When the operating portion 5c is downwardly operated from this state, the first mask member 5 slides downwardly against the spring force of the spring 9.

Simultaneously therewith, the rotatable lever 8 pin-coupled to the first mask member 5 is rotated counter-clockwise about the shaft 9. Thus, the second mask member 4 pin-coupled to the rotatable lever 8 is raised upwardly. At this time, the second mask member 4 may rotate about the slot 4c because it is supported by only the pin 8b (in this state, there will be no hindrance even if the second mask member rotates).

When the first mask member 5 further slides downwardly, the protruding portion 5d rides across the restraining portion 10a of the leaf spring 10. The first and second mask members 5 and 4 then assume their positions shown in FIG. 3.

At this time, the second mask member 4 can incline about the slot 4c, but the restraining portions 4a and 4b strike against the underside 11a of the keeper plate 11 and therefore, when it assumes the position of FIG. 3, the second mask member is held in a position substantially parallel to the underside 3a of the opening in the aperture member 3.

When the protruding portion 5d of the first mask member 5 rides across the restraining portion 10a, a feeling of a click detent is felt by the fingers which operate the operating portion 5c and the operation is terminated. Even if in this state, the operating portion 5c is released, the protruding portion 5d will be held while striking against the restraining portion 10a. This is because the spring force of the spring is set to a level smaller than the force with which the protruding portion 5d flexes the leaf spring 10 and rides across the restraining portion 10a.

In the state of FIG. 3, some of rays of light in the opening in the aperture member 3 are eclipsed by the first mask member 5 and the second mask member 4 and thus, photographing of the panorama size becomes possible.

A description will now be given of the operation of restoring the opening size. When the operating portion 5c of the first mask member 5 is moved upwardly, the protruding portion 5d rides across the restraining portion 10a and the first and second mask members 5 and 4 are moved by an operation converse to that when they are moved downwardly, and are held in their positions of FIG. 2 by the spring force of the spring 9.

At this time, one of the restraining portions 4a and 4b strikes against one of the bases 6a and 6b without fail and therefore, the second mask member 4 is held in a position substantially parallel to the underside 3a of the opening of the aperture member 3.

Figure 4:
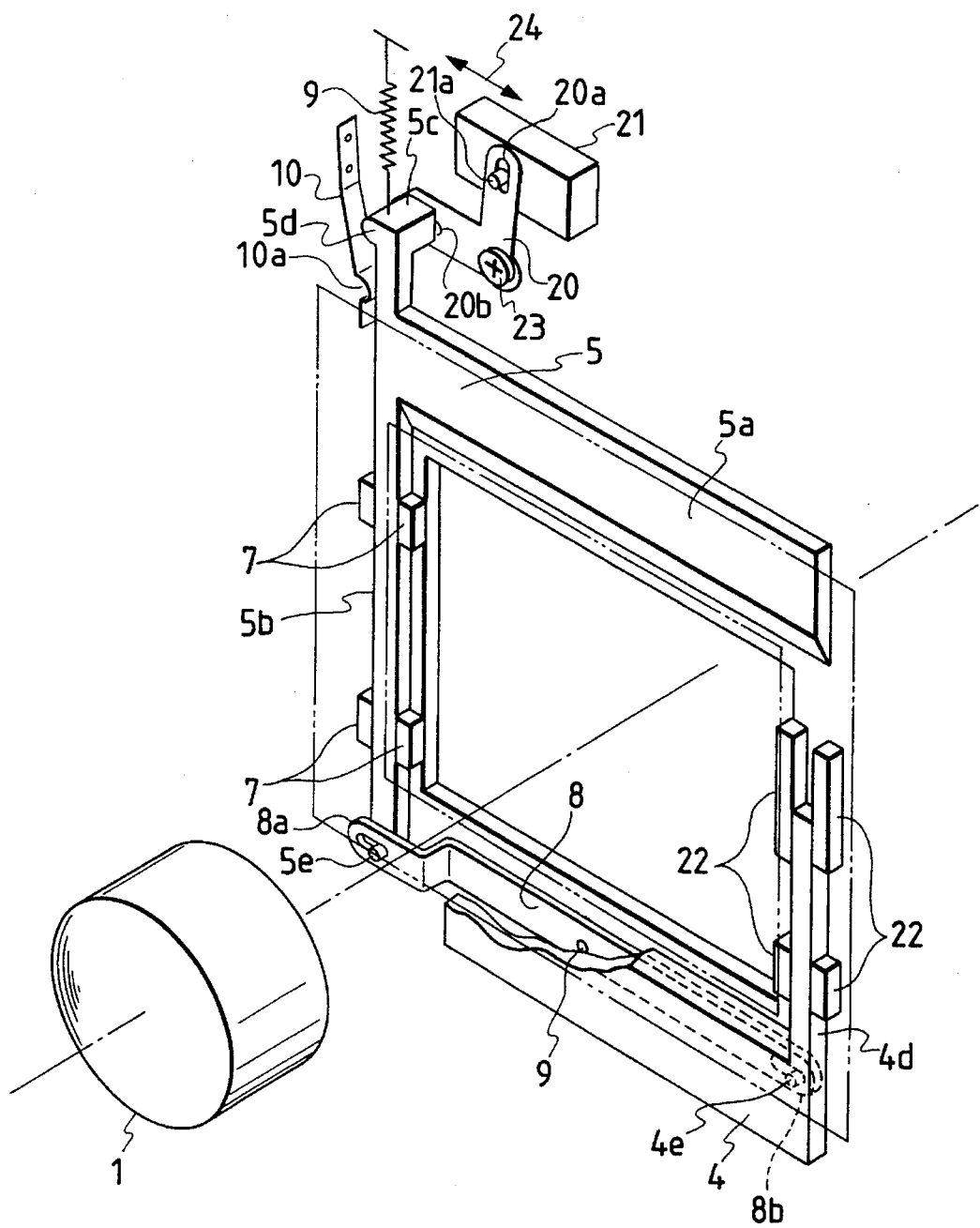
FIG. 4 is a perspective view showing a second embodiment of the camera of the present invention of which the photographing image field is changeable.

FIG. 4 is a perspective view showing a second embodiment of the panorama apparatus of the camera according to the present invention. In this embodiment, portions functionally similar to those in the afore-described first embodiment are given similar reference characters and need not be described.

The second mask member 4 has a support portion 4d and is supported for movement only in a vertical direction by guide portions 22 protruded from the main body 2. The second mask member 4 further has a slot 4e which is engaged by the pin 8b of a rotatable lever 8. The rotatable lever 8 is rotatable about a shaft 9 to thereby move the second mask member 4.

An interlocking plate 20 is rotatably supported on the main body 2 by a screw 23. A slot 20a in the interlocking plate 20 is engaged by the pin 21a of a second operating member 21. The second operating member 21 is supported on a main body, not shown, for sliding movement only in the lengthwise direction thereof. A slot 20b in the interlocking plate 20 is engaged by a pin, not shown, of the operating portion 5c.

In this manner, the movement by the horizontal operation (arrow 24) of the second operating member 21 is changed into the vertical movement of the operating portion 5c. The other operations are substantially similar to those of the first embodiment.

Figure 5:
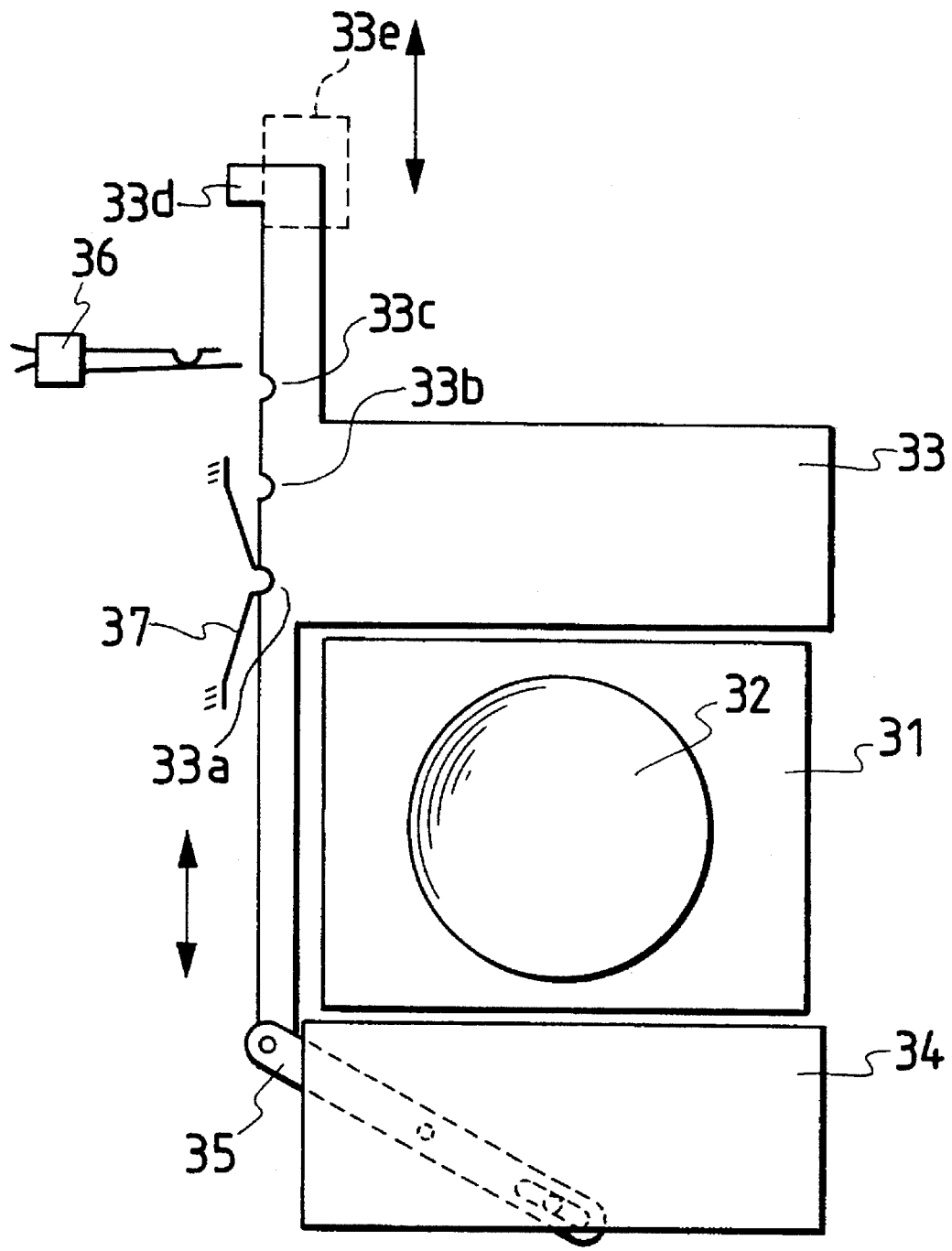
FIG. 5 is a view of a third embodiment of the camera of the present invention of which the photographing image field is changeable as it is seen from the rear of the camera during the photographing of the standard size.
Figure 6:
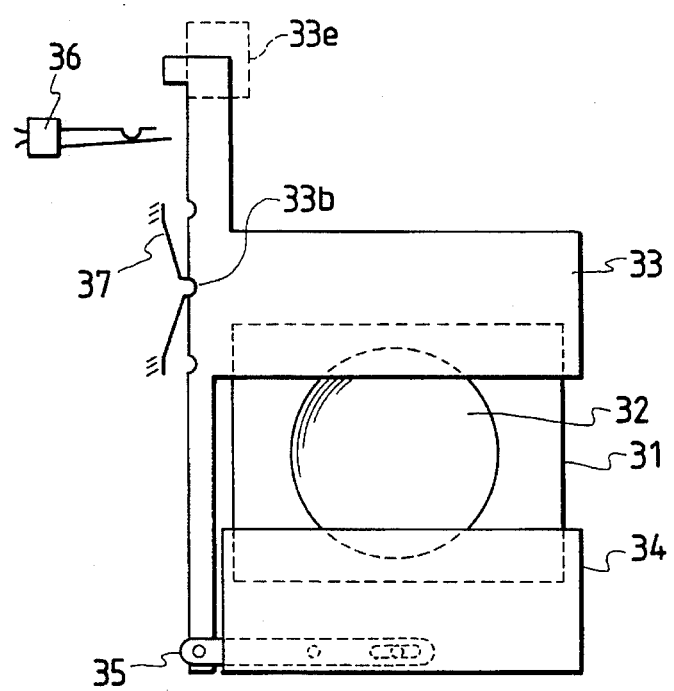
FIG. 6 is a view of the camera according to the third embodiment as it is seen from the rear of the camera during the photographing of the panorama size.
Figure 7:
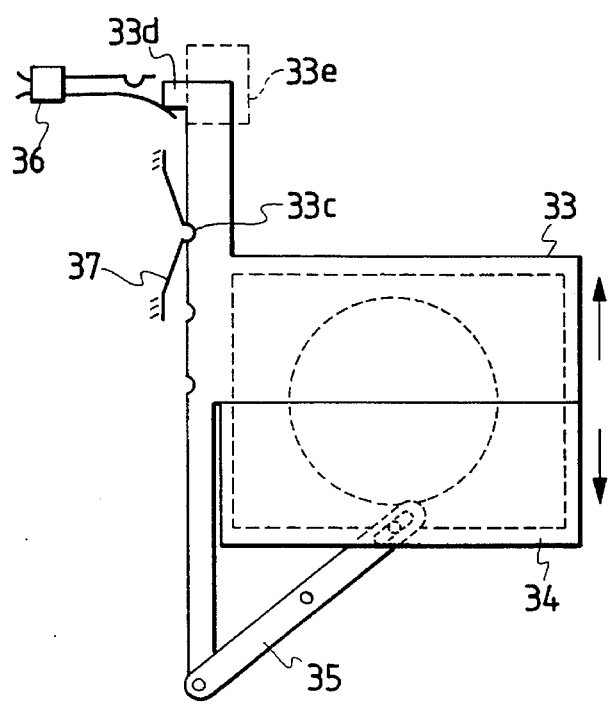
FIG. 7 is a view of the camera according to the third embodiment as it is seen from the rear of the camera during the retraction or collapse of the barrel of the camera.

FIGS. 5 to 7 are views of a third embodiment of the camera of the present invention of which the photographing image field is changeable as it is seen from the rear of the camera.

In a camera wherein a movable lens barrel retracts or collapses, the movable lens barrel facing the aperture member is moved to the vicinity of the aperture member during the barrel retracting or collapsing and is held thereat. When in this state, the back lid of the camera is to be opened to insert film into the camera, it has sometimes been the case that dust adheres to the lens of the lens barrel and/or the lens is touched by a finger to thereby leave a fingerprint thereon, thus hindering photographing.

So, in the third embodiment, a movable mask for panorama photographing is utilized so that the whole opening of the aperture member may be covered with the movable mask during the retracting or collapsing of the lens barrel.

In FIG. 5, the reference numeral 31 designates an aperture member the reference numeral 32 denotes a movable lens barrel, the reference numeral 33 designates a first mask member, the reference numeral 34 denotes a second mask member, the reference numeral 36 designates a main switch, the reference numeral 35 denotes a rotatable lever, and the reference numeral 37 designates a leaf spring.

The first mask member 33 has recesses 33a, 33b, 33c, a protruding portion 33d and an operating portion 33e protruded from a body cover, not shown, and is movable only in a vertical direction. The leaf spring 37 is supported on a main body, not shown, and is engaged with the recesses 33a, 33b and 33c with a feeling of a click detent.

When the leaf spring 37 is in the recess 33a, the photographing of the standard size (FIG. 5) is possible, and when the leaf spring 37 is in the recess 33b, the photographing of the panorama size (FIG. 6) is possible.

Also, when as shown in FIG. 7, the leaf spring 37 is in the recess 33c, the main switch 36 is opened by the protruding portion 33d.

The second mask member 34 is movable only in a vertical direction through the rotatable lever 35 with the movement of the first mask member 33.

FIG. 7 shows a state in which the main switch 36 is OFF and the movable lens barrel 32 retracts or collapses. The movable lens barrel 32 is held in a position in which it is brought close to the aperture member 31, but the opening in the aperture member 3 is fully covered with the first and second mask members 33 and 34 and therefore, no dust can adhere to the lens of the movable lens barrel 32 and the photographer cannot inadvertently touch the lens.

When the operating portion 33e is operated upwardly, the first and second mask members 33 and 34 can be changed to the photographing position for the panorama size (FIG. 6) and the photographing position for the standard size (FIG. 5).

According to the third embodiment, it never happens in a camera wherein a movable lens barrel retracts or collapses that dust adheres to the lens thereof or a finger touches the lens.

The present invention is not restricted to the above-described embodiments, but various modifications thereof are possible. For example, the protruding portion 5d and leaf spring 10 in the first embodiment act to merely provide a click detent, but the design may also be such that a switch is closed and opened by this operation to thereby change the exposure control at the standard size and the panorama size.

As described above, according to the present invention, the number of parts may be small, and this leads to reduced costs. Also, only a small space is required to construct the parts, and this is effective for the downsizing of the camera.

What is claimed is:

1. A camera of which the photographing image field is changeable, comprising:

an aperture member having an opening in a plane substantially perpendicular to an optical axis for defining a first photographing image field;

first and second mask members movable in directions substantially perpendicular to said optical axis to shield a portion of said opening in said aperture member from opposite sides of the opening and define a second photographing image field;

an operator for moving said first mask member; and an interlocking member connecting said first mask member to said second mask member for moving said second mask member in a direction opposite to the direction of movement of said first mask member in response to the movement of said first mask member, said interlocking member comprising a single elongated lever extending in and rotatable in a plane adjacent to and parallel to the plane of said opening, said lever having one end thereof engaged with said first mask member and the other end thereof engaged with said second mask member and having a pivot supporting said lever at a center of rotation between the two ends, said lever constituting the sole operative connection between said first mask member and said second mask member, said first mask member having a mechanism that ensures that movement of said first mask member is rectilinear and said second mask member having a mechanism that establishes a predetermined orientation of said second mask member relative to said first mask member at opposite sides of said opening.

2. A camera according to claim 1, wherein said operator is operatively associated with a second operator having a direction of operation differing from a direction of operation of the first-mentioned operator.

3. A camera according to claim 1, wherein said first and second mask members are movable to fully shield the opening in said aperture member.

4. A camera according to claim 3, further comprising a movable lens barrel adapted to be moved to the vicinity of said aperture member and stopped at that position and wherein when said lens barrel is at said position, said first and second mask members fully shield the opening in said aperture member.

5. A camera according to claim 1, further comprising:

a biasing member for biasing said first mask member in the direction opposite to the direction of movement thereof; and a restraining member for restraining, when said second mask member is moved in response to the movement of said first mask member against the biasing force of said biasing member, said first and second mask members at that moved position.

6. A camera according to claim 5, further comprising:

a switch for detecting the restraining state of said restraining member; and means for giving a change to the photographing operation in said first and second photographing image fields on the basis of a change in the state of said switch.

7. A camera comprising:

a main body having an aperture member with an opening therein in a plane substantially perpendicular to an optical axis;

a first mask usually located adjacent to one side portion of said opening and outside said opening;

a second mask usually located adjacent to an opposite side portion of said opening and outside said opening;

an operator for moving said first mask in a direction substantially perpendicular to said optical axis and shielding a portion of said opening by said first mask;

said first mask having an extension portion extending along the direction of movement toward said second mask; and a rotatable lever supported for rotation on a pivot provided in said main body and having one end thereof rotatably connected to said extension portion of said first mask and the other end thereof rotatably connected to said second mask, whereby when said operator moves said first mask, said first mask shields a portion of said opening and said second mask is moved toward said first mask by said extension portion and said rotatable lever to thereby shield a portion of said opening, wherein said lever extends in and rotates in a plane adjacent to and substantially parallel to the plane of said opening, wherein said lever constitutes the sole operative connection between said first mask and said second mask, and wherein said first mask has a mechanism that ensures that movement of said first mask is rectilinear and said second mask has a mechanism that establishes a predetermined orientation of said second mask relative to said first mask at opposite sides of said opening.

8. A camera according to claim 7, wherein said first and second masks shield portions of said opening to thereby define a photographing image field.

9. A camera according to claim 7, wherein said first and second masks shield portions of said opening to thereby fully shield said opening.

10. A camera according to claim 9, further comprising a movable lens barrel adapted to be moved to the vicinity of said member and stopped at that position and wherein when said lens barrel is at said position, said first and second masks fully shield said opening.

11. A camera of which the photographing image field is changeable, comprising:

an aperture member having an opening in a plane substantially perpendicular to an optical axis for defining a first photographing image field;

first and second mask members movable in directions substantially perpendicular to said optical axis to thereby shield a portion of said opening in said aperture member from opposite sides of the opening and define a second photographing image field;

an operator for moving said first mask member; and an interlocking member connecting said first mask member to said second mask member for moving said second mask member toward said first mask member in response the movement of said first mask member, said interlocking member comprising an elongated lever extending in and rotatable in a plane adjacent to and parallel to the plane of said opening, said lever having one end thereof engaged with said first mask member and the other and thereof engaged with said second mask member and having a pivot supporting said lever at a center of rotation between the two ends, said lever constitute the sole operative connection between said first mask member and said second mask member, said first mask member having a mechanism that ensures that movement of said first mask member is rectilinear and said second mask member having a mechanism that establishes predetermined orientation of said second mask member relative to said first mask member at opposite sides of said opening.

12. A camera according to claim 11, wherein said operator is operatively associated with a second operator having a direction of operation differing from a direction of operation of the first-mentioned operator.

13. A camera according to claim 11, wherein said first and second mask members are movable to fully shield the opening in said aperture member.

14. A camera according to claim 13, further comprising a movable lens barrel adapted to be moved to the vicinity of said aperture member and stopped at that position and wherein when said lens barrel is at said position, said first and second mask members fully shield the opening in said aperture member.

\* \* \* \* \*